United States Patent
Koketsu et al.

(10) Patent No.: US 9,487,436 B2
(45) Date of Patent: Nov. 8, 2016

(54) OPTICAL MEMBER, IMAGE PICKUP APPARATUS, AND METHOD FOR MANUFACTURING OPTICAL MEMBER

(71) Applicant: CANON KABUSHIKI KAISHA, Tokyo (JP)

(72) Inventors: Naoyuki Koketsu, Tokyo (JP); Zuyi Zhang, Yokohama (JP); Yoshinori Kotani, Yokohama (JP); Akiko Takei, Fujisawa (JP); Akira Sugiyama, Yokohama (JP); Kenji Takashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 14/358,912

(22) PCT Filed: Nov. 12, 2012

(86) PCT No.: PCT/JP2012/007229
§ 371 (c)(1),
(2) Date: May 16, 2014

(87) PCT Pub. No.: WO2013/073150
PCT Pub. Date: May 23, 2013

(65) Prior Publication Data
US 2014/0293114 A1   Oct. 2, 2014

(30) Foreign Application Priority Data

Nov. 18, 2011   (JP) ................................. 2011-253071
Oct. 29, 2012    (JP) ................................. 2012-237793

(51) Int. Cl.
*C03C 17/02* (2006.01)
*C03C 15/00* (2006.01)
(Continued)

(52) U.S. Cl.
CPC ............. *C03C 17/02* (2013.01); *C03C 11/005* (2013.01); *C03C 15/00* (2013.01); *C03C 17/006* (2013.01);
(Continued)

(58) Field of Classification Search
CPC ....... C03C 17/02; C03C 23/00; C03C 15/00; C03C 17/00; C03C 11/02
USPC ...................................... 65/31, 17.6
See application file for complete search history.

(56) References Cited

U.S. PATENT DOCUMENTS 4,080,188 A    3/1978   Doddato
4,273,826 A    6/1981   McCollister
(Continued)

FOREIGN PATENT DOCUMENTS

DE     3820547 A1    12/1988
EP     130801 A1      1/1985
(Continued)

OTHER PUBLICATIONS

Tengzelius Rohe V et al., "Development of Porous Antireflective Films on Soda-Lime-Silica Glass", Journal of the American Ceramic Society, Feb. 1984, pp. 142-146, vol. 67, No. 2, Columbus, Ohio, USA.

(Continued)

*Primary Examiner* — Mark Halpern
(74) *Attorney, Agent, or Firm* — Canon USA, Inc. I.P. Division

(57) ABSTRACT

The present invention provides an optical member including a porous glass film on a base member, wherein a ripple is suppressed.
The optical member includes the base member and the porous glass film disposed on the base member, wherein the porosity increases in the direction from the base member toward the porous glass film in an interfacial region between the base member and the porous glass film and the porosity is continuous in the film thickness direction from the base member to the surface of the porous glass film in the optical member.

9 Claims, 5 Drawing Sheets

(51) Int. Cl.
*C03C 17/00* (2006.01)
*C03C 11/00* (2006.01)

(52) U.S. Cl.
CPC ..... *C03C 2217/425* (2013.01); *C03C 2217/91* (2013.01); *G02B 2207/107* (2013.01); *Y10T 428/249969* (2015.04)

(56) References Cited

U.S. PATENT DOCUMENTS

| | | | |
|---|---|---|---|
| 4,313,748 | A | 2/1982 | Macedo et al. |
| 4,778,777 | A | 10/1988 | Eguchi et al. |
| 5,516,350 | A | 5/1996 | Onoda et al. |
| 7,132,374 | B2 | 11/2006 | Mak et al. |
| 9,212,088 | B2 * | 12/2015 | Takashima ............. C03C 15/00 |
| 2004/0096672 | A1 | 5/2004 | Lukas et al. |
| 2005/0146730 | A1 | 7/2005 | Endo et al. |
| 2007/0063453 | A1 | 3/2007 | Ishikawa et al. |
| 2011/0042301 | A1 | 2/2011 | Zhang et al. |

FOREIGN PATENT DOCUMENTS

| | | |
|---|---|---|
| EP | 0721112 A2 | 7/1996 |
| JP | S56-092138 A | 7/1981 |
| JP | 64083583 A | 3/1989 |
| JP | H01-083583 A | 3/1989 |
| JP | H01192775 A | 8/1989 |
| JP | H03115139 A | 5/1991 |
| JP | 2002160941 A | 6/2002 |
| JP | 2006193341 A | 7/2006 |
| WO | 00/13768 A1 | 3/2000 |

OTHER PUBLICATIONS

Mukherjee, S.P., "Gel-derived single-layer antireflection films with a refractive index gradient", Thin Solid Films, (1981), pp. L89-L90.

Minot et al, "Single-layer, gradient refractive index antireflection films effective from 0.35 to 2.5 [mu]", Optical Society of America, Jun. 1976, pp. 515-519, vol. 66, No. 6.

* cited by examiner

OPTICAL MEMBER, IMAGE PICKUP APPARATUS, AND METHOD FOR MANUFACTURING OPTICAL MEMBER

This application is a 371 of PCT/JP2012/007229 filed on 12 Nov. 2012.

TECHNICAL FIELD

The present invention relates to an optical member provided with a porous glass film on a base member and an image pickup apparatus provided with the optical member. In addition, the present invention relates to a method for manufacturing the optical member.

BACKGROUND ART

In recent years, the industrial utilization of porous glasses as adsorbing agents, microcarrier supports, separation films, optical materials, and the like has been highly anticipated. In particular, porous glasses have a wide utilization range as optical members because of a characteristic of low refractive index.

As for a method for manufacturing a porous glass relatively easily, a method taking advantage of a phase separation phenomenon has been mentioned. A typical example of a base material for the porous glass exhibiting the phase separation phenomenon is borosilicate glass made from silicon oxide, boron oxide, an alkali metal oxide, and the like. In production, the phase separation phenomenon is induced by a heat treatment in which a molded borosilicate glass is held at a constant temperature (hereafter referred to as a phase separation treatment), and a non-silicon oxide rich phase, which is a soluble component, is eluted through etching with an acid solution. The skeleton constituting the thus produced porous glass is primarily silicon oxide. The skeleton diameter, the hole diameter, and the porosity of the porous glass have influences on the reflectance and the refractive index of the light.

NPL 1 discloses a configuration in which the porosity is controlled in etching in such a way that elution of a non-silicon oxide rich phase is allowed to become insufficient partly and, thereby, the refractive index increases from the surface toward the inside. Consequently, reflection at a porous glass surface is reduced.

Meanwhile, PTL 1 discloses a method for forming a porous glass film on a base member. Specifically, a film containing borosilicate glass (phase-separable glass) is formed on a base member by a printing method, and a porous glass film is formed on the base member by a phase separation treatment and an etching treatment.

CITATION LIST

Patent Literature

PTL 1: Japanese Patent Laid-Open No. 01-083583

Non Patent Literature

NPL 1: J. Opt. Soc. Am., Vol. 66, No. 6, 1976

SUMMARY OF INVENTION

Technical Problem

In the case where several micrometers of porous glass film is formed on the base member as described in PTL 1, when light is incident on the porous glass surface, the light reflected at the porous glass surface interferes with the light reflected at the interface between the base member and the porous glass, so that a ripple (interference fringe) occurs.

NPL 1 does not disclose a configuration in which a porous glass layer is disposed on a base member. According to the method described in NPL 1, it is difficult to control the degree of proceeding of etching and, therefore, it is difficult to control the refractive index. In addition, a non-silicon oxide rich phase, which is a soluble component, remains and, thereby, the water resistance is degraded, so that problems, e.g., clouding, in the use as an optical member occur.

The present invention provides an optical member including a porous glass film on a base member, wherein a ripple is suppressed, and a method for manufacturing the optical member easily.

Solution to Problem

An optical member according to an aspect of the present invention is provided with a base member and a porous glass film disposed on the above-described base member, wherein the porosity increases in the direction from the above-described base member toward the above-described porous glass film in an interfacial region between the above-described base member and the above-described porous glass film and the porosity is continuous in the film thickness direction from the above-described base member to the surface of the above-described porous glass film in the optical member.

A method for manufacturing an optical member provided with a porous glass film on a base member, according to an aspect of the present invention, includes the steps of forming a glass powder film containing a glass powder on the base member, forming a phase-separable base material glass film on the above-described base member by heating and fusing the above-described glass powder film in such a way that the temperature in the side nearer to the above-described base member than the center of the above-described glass powder film is becomes higher as compared with the temperature in the side opposite to the above-described base member with respect to the center of the above-described glass powder film, forming a phase-separated glass film on the above-described base member by heating the above-described base material glass film, and forming a porous glass film on the above-described base member by subjecting the above-described phase-separated glass film to an etching treatment.

Advantageous Effects of Invention

According to aspects of the present invention, an optical member including a porous glass film on a base member, wherein a ripple is suppressed, and a method for manufacturing the optical member easily are provided.

DESCRIPTION OF EMBODIMENTS

Figure 1:
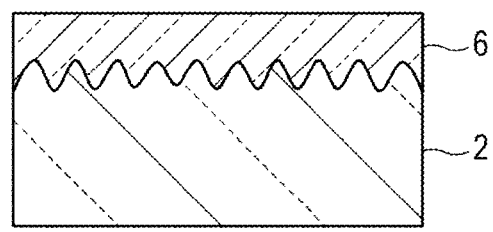
FIG. 1 is a schematic sectional view showing an example of an optical member according to an aspect of the present invention.

The present invention will be described below in detail with reference to the embodiments according to the present invention. In this regard, well known or publicly known technologies in the related art are adopted for the portions not specifically shown in the drawings and the descriptions in the present specification.

Optical Member

FIG. 1 shows a schematic sectional view of an optical member according to an aspect of the present invention. The optical member according to an aspect of the present invention is provided with a porous glass film 6 having a porous structure including continuous holes derived from spinodal type phase separation on a base member 2. The porous glass film 6 is a low-refractive index film and is expected to be utilized as an optical member because reflection at the interface between the porous glass film 6 and the air (surface of the porous glass film 6) is suppressed. However, in the optical member provided with the porous glass film on the base member 2, a ripple phenomenon occurs, where an interference fringe appears in the reflected light because of an interference effect of the light reflected at the surface of the porous glass film 6 and the light reflected at the interface between the base member 2 and the porous glass film 6. In particular, this interference effect is enhanced and the ripple phenomenon appears considerably in the case where the thickness of the porous glass film 6 is more than or equal to the wavelength of light and less than or equal to several ten micrometers. When the reflectance is measured and a graph is prepared while the horizontal axis indicates the wavelength and the vertical axis indicates the reflectance, the ripple is represented by the shape in which the magnitude fluctuates periodically like a sinusoidal wave (refer to Comparative example in FIG. 7). If such a ripple is present, the wavelength dependence of the reflectance is enhanced, and suitability for the optical member may be degraded.

The optical member according to an embodiment of the present invention has a configuration in which the porosity increases in the direction from the base member 2 toward the porous glass film 6 in an interfacial region 4 between the base member 2 and the porous glass film 6 and the porosity is continuous in the film thickness direction from the base member 2 to the surface of the porous glass film 6 in the optical member.

More specifically, recessed and convex portions are included in this interfacial region 4 in the configuration employed. In the interfacial region 4 in which the recessed and convex portions are disposed, the porous glass film 6 is disposed on the recessed portion at the interface between the base member 2 and the porous glass film 6. Therefore, the porosity of the optical member has a gradient as described above. A sharp change in the refractive index at the interface between the base member 2 and the porous glass film 6 is suppressed by this configuration, and reflection at this interface is substantially suppressed. As a result, it is possible to suppress a ripple due to interference of the light reflected at the surface of the porous glass film 6 with the light reflected at the interface between the base member 2 and the porous glass film 6.

The term "porosity is continuous" refers to that, when the porosity of every 4 nm of region is calculated, the difference in porosity between adjacent two regions, 4 nm each, is less than 2.5%. Specifically, in the case where a region A and a region B are disposed in that order from the base member 2 side, the porosity of the region A is specified to be a %, and the porosity of the region B is specified to be b %, the difference in porosity refers to |b−a|. The region A may include the base member 2, and the porosity of the base member 2 is substantially 0%. Here, the values of a and b include the value of 0% (for example, base member portion). The porosity of the interfacial region 4 increases continuously from 0% toward the porous glass film 6. In the region in which the porous glass film 6 has been formed, the porosity does not change sharply, and the porosity is continuous over the surface of the porous glass film 6.

The convex portion of interfacial region is formed from the same material as the material for the base member 2, and the recessed portion is formed from the same material as the material for the porous glass film 6. That is, in the material configuration, the same material as the material for the base member 2 and the same material as the material for the porous glass film 6 are repeated in that order in an inplane direction of the base member 2 in this interfacial region 4.

The film thickness of the interfacial region 4 provided with the recessed and convex portions is preferably 50 nm or more, and desirably 100 nm or more. If the film thickness is less than 50 nm, a change in the refractive index at the interface between the base member 2 and the porous glass film 6 becomes sharp, so that reflection at this interface is not suppressed easily.

The optical member according to an aspect of the present invention is divided into a region in which the porosity is 0%, an interfacial region in which the porosity increases, and a region in which holes are included and the porosity is not 0%, but constant in that order from the base member 2 toward the porous glass film 6.

The term "phase separation" that forms a porous structure according to an aspect of the present invention will be described with reference to an example in which borosilicate glass containing silicon oxide, boron oxide, and an oxide having an alkali metal is used as a glass body. The term "phase separation" refers to separation of a phase with a composition of the oxide having an alkali metal and the boron oxide larger than the composition before the phase separation occurs (non-silicon oxide rich phase) from a phase with a composition of the oxide having an alkali metal and the boron oxide smaller than the composition before the phase separation occurs (silicon oxide rich phase) in the inside of glass, where the structures are on a scale of several nanometers to several ten micrometers. The phase-separated glass is subjected to an acid treatment to remove the non-silicon oxide rich phase, so that a porous structure is formed in the glass body.

The phase separation is classified into a spinodal type and a binodal type. A fine hole of the porous glass obtained by spinodal type phase separation is a through hole connected from the surface to the inside. More specifically, the structure derived from the spinodal type phase separation is an "ant nest"-shaped structure in which holes are three-dimensionally connected. The skeleton made from silicon oxide can be regarded as a "nest" and a through hole can be regarded as a "burrow". Meanwhile, a porous glass obtained by binodal type phase separation has a structure in which independent holes, each surrounded by a closed curved surface substantially in the shape of a sphere, are present in the skeleton made from silicon oxide discontinuously. The hole derived from spinodal type phase separation and the hole derived from binodal type phase separation are determined and distinguished on the basis of the result of observation of their shapes by using an electron microscope. In addition, the spinodal type phase separation and the binodal type phase separation are specified by controlling the composition of the glass body and the temperature in phase separation.

The thickness of the porous glass film 6 is not specifically limited, and is preferably 200 nm or more and 50.0 micrometers or less, and more preferably 300 nm or more and 20.0 micrometers or less. If the thickness is less than 50 nm, a porous glass film 6 exhibiting an effect of suppressing a ripple and having high surface strength and a high porosity (low refractive index) is not obtained. If the thickness is more than 50.0 micrometers, an effect of haze increases and the handleability as an optical member is degraded.

As for the thickness of the porous glass film 6, specifically, a scanning electron microscope (FE-SEM S-4800, produced by Hitachi, Ltd.) is used and a SEM image (electron micrograph) at an acceleration voltage of 5.0 kV is taken. The thickness of the glass film portion on the base member of the taken image is measured at 30 or more points and the average value thereof is used.

The porosity of the porous glass film 6 in itself is not specifically limited, and is preferably 30% or more and 70% or less, and more preferably 40% or more and 60% or less. If the porosity is less than 30%, the advantages of the porosity are not fully utilized. If the porosity is more than 70%, the surface strength tends to be reduced unfavorably. As described above, it is desirable that the porosity of the interfacial region 4 of the optical member be increased continuously from the base member 2 toward the porous glass film 6.

The electron microscopy image is binarized into a skeleton portion and a hole portion. Specifically, the scanning electron microscope (FE-SEM S-4800, produced by Hitachi, Ltd.) is used and the porous glass is subjected to surface observation at an acceleration voltage of 5.0 kV at a magnification of 100,000× (50,000× in some cases), where shading of the skeleton is observed easily. The skeleton portion of the recessed and convex portions includes the portion of the base member besides the portion other than holes of the porous glass film.

Figure 2:
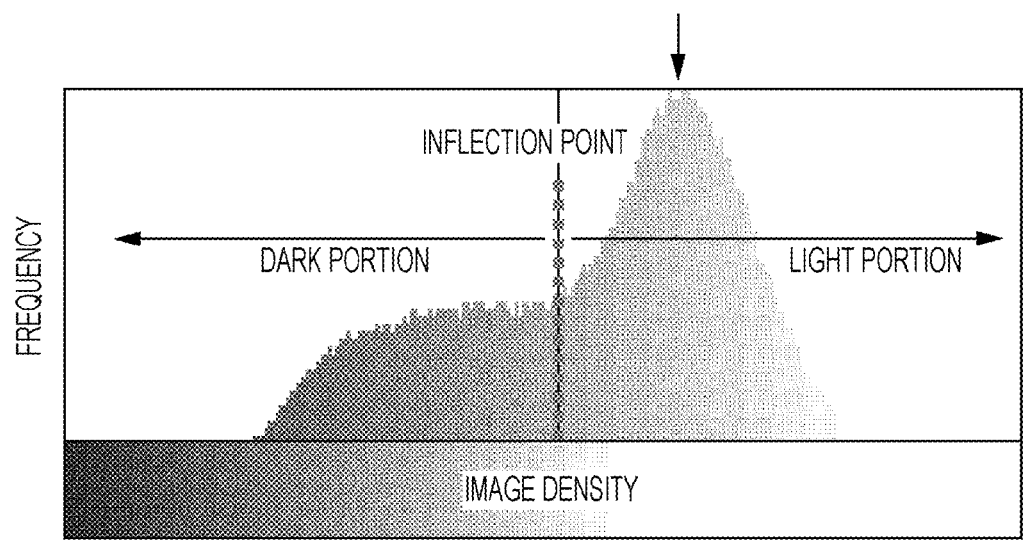
FIG. 2 is a diagram illustrating a porosity.

The observed image is stored as an image, and the SEM image is made into a graphical form on the basis of the frequency of image density by using image analysis software. FIG. 2 is a diagram showing the frequency on the basis of the image density of a porous glass having a spinodal type porous structure. In FIG. 2, the peak portion indicated by an arrow in the downward direction of the image density corresponds to the skeleton portion located at the front.

The light portion (skeleton portion) and the dark potion (hole portion) are binarized into white and black, where an inflection point near the peak position is taken as a threshold value. An average value of the ratios of the area of dark portion to the area of total portion (sum of areas of white and black portions) of the whole image is determined and is taken as the porosity.

The average hole diameter of the porous glass film 6 is preferably 1 nm or more and 200 nm or less, and more preferably 5 nm or more and 100 nm or less. If the average hole diameter is less than 1 nm, the characteristics of the porous structure are not fully utilized. If the average hole diameter is more than 100 nm, the surface strength tends to be reduced unfavorably. In this regard, the average hole diameter can be smaller than the thickness of the porous glass film.

Figure 3A:
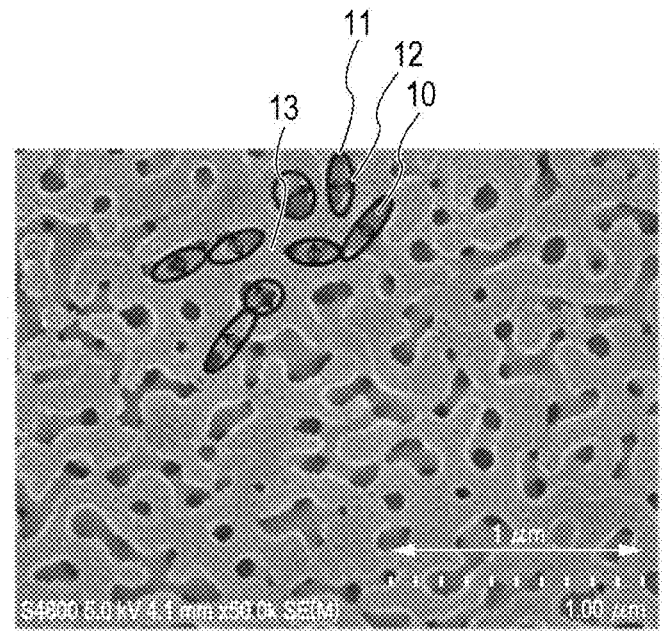
FIG. 3A is a diagram illustrating an average hole diameter.

The average hole diameter in the present invention is defined as an average value of the minor axes of a plurality of approximated ellipses, where holes in the porous body surface are approximated by the plurality of ellipses. Specifically, for example, as shown in FIG. 3A, an electron micrograph of the porous body surface is used, holes 10 are approximated by a plurality of ellipses 11, an average value of the minor axes 12 of the individual ellipses is determined and, thereby, the average hole diameter is obtained. At least 30 points are measured and an average value thereof is determined The average skeleton diameter of the porous glass film 6 is preferably 1 nm or more and 50 nm or less. If the average skeleton diameter is more than 50 nm, the light is scattered considerably, and the transmittance is reduced significantly. If the average skeleton diameter is less than 1 nm, the strength of the porous glass film 6 tends to become small.

Figure 3B:
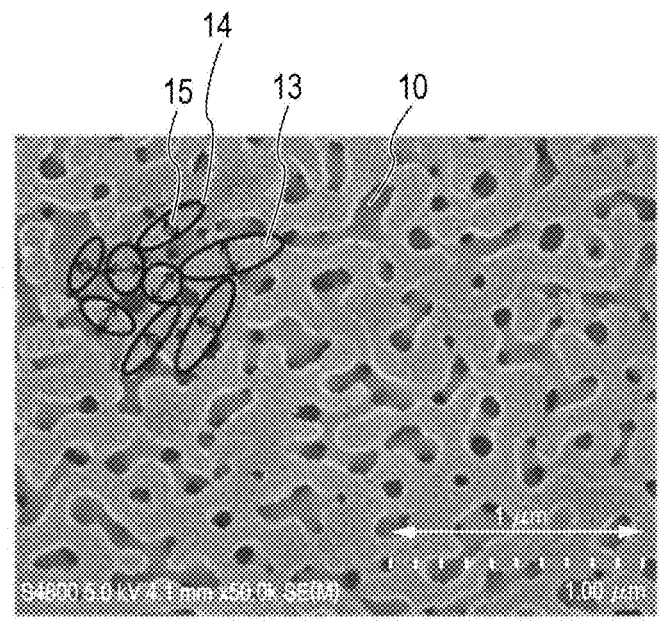
FIG. 3B is a diagram illustrating an average skeleton diameter.

The average skeleton diameter in the present invention is defined as an average value of the minor axes of a plurality of approximated ellipses, where the skeleton of the porous body surface is approximated by the plurality of ellipses. Specifically, for example, as shown in FIG. 3B, an electron micrograph of the porous body surface is used, the skeleton 13 is approximated by a plurality of ellipses 14, an average value of the minor axes 15 of the individual ellipses is determined and, thereby, the average skeleton diameter is obtained. At least 30 points are measured and an average value thereof is determined The hole diameter and the skeleton diameter of the porous glass film 6 may be controlled by the material serving as a raw material and the heat treatment condition in spinodal type phase separation.

Specifically, the optical members according to aspects of the present invention may be used for optical members, e.g., polarizers used in various displays of televisions, computers, and the like and liquid crystal display apparatuses, finder lenses for cameras, prisms, fly-eye lenses, and toric lenses. The optical members may be further used for various lenses of image taking optical systems, observation optical systems, e.g., binoculars, projection optical systems used for liquid crystal projectors and the like, and scanning optical systems used for laser beam printers and the like, in which porous glasses are used.

Figure 4:
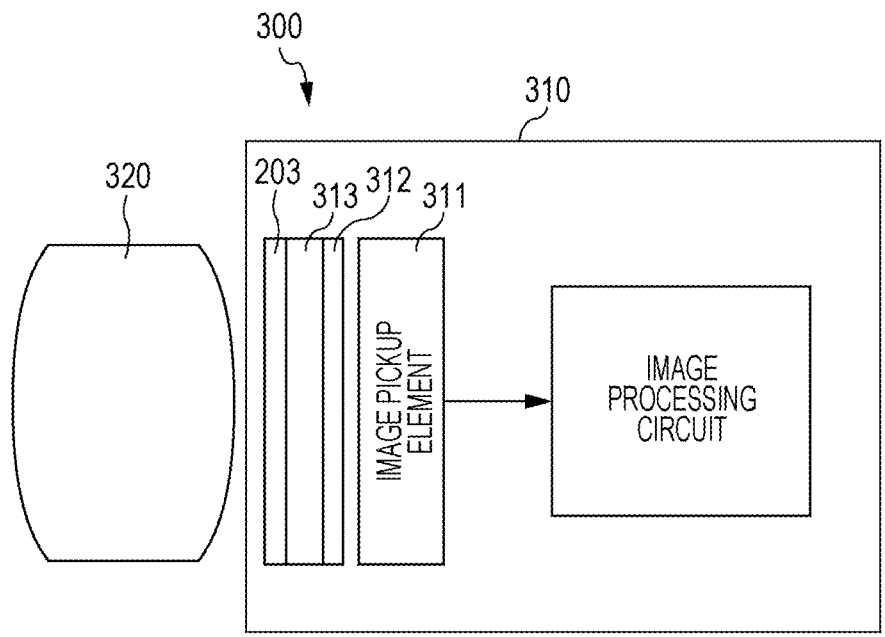
FIG. 4 is a schematic diagram showing an example of an image pickup apparatus including an optical member according to an aspect of the present invention.

The optical members according to aspects of the present invention may be mounted on image pickup apparatuses, e.g., digital cameras and digital video cameras. FIG. 4 is a schematic sectional diagram showing a camera (image pickup apparatus) that uses an optical member 203 according to an embodiment of the present invention, specifically, an image pickup apparatus that forms a subject image from a lens onto an image pickup element through an optical filter. An image pickup apparatus 300 includes a main body 310 and a detachable lens 320. The image pickup apparatus, e.g., a digital single-lens reflex camera, obtains imaging screens at various field angles by changing an imaging lens to be used for photographing to a lens having a different focal length. The main body 310 includes an image pickup element 311, an infrared-cut filter 312, a low-pass filter 313, and the optical member 203 according to an aspect of the present invention. The optical member 203 is configured to include the porous glass film 6 on the base member 2, as shown in FIG. 1.

The optical member 203 and the low-pass filter 313 may be formed integrally or be formed independently. The optical member 203 may be configured to also serve as a low-pass filter. That is, the base member 2 of the optical member 203 may be the low-pass filter.

The image pickup element 311 is held in a package (not shown in the drawing) and this package keeps the image pickup element 311 in a hermetically sealed state with a cover glass (not shown in the drawing). A CMOS element or a CCD element may be used as the image pickup element.

A sealing member, e.g., a double-sided tape, seals between the optical filters, e.g., the low-pass filter 313 and the infrared-cut filter 312, and the cover glass (not shown in the drawing). An example in which both the low-pass filter 313 and the infrared-cut filter 312 are provided will be described, although any one of them may be provided alone.

The optical member 203 according to an aspect of the present invention can be disposed in such a way that the base member is located in the image pickup element 311 side and the porous glass film is located in the lens 320 side. That is, the porous glass film 6 can be disposed in such a way as to be located farther from the image pickup element 311 than the base member 2 is.

Method for Manufacturing Optical Member

FIG. 5A to FIG. 5D are schematic diagrams illustrating an example of a method for manufacturing an optical member according to an aspect of the present invention. The optical member according to an aspect of the present invention is configured to include a porous glass film on a base member and is formed as described below. A glass powder film containing a glass powder is formed on the base member, the glass powder film is heated and fused so as to be converted to a base material glass film, and the base material glass film is subjected to a phase separation treatment and an etching treatment, so that a porous glass film is formed on the base member. In the manufacturing method according to an aspect of the present invention, the glass powder film is heated and fused in such a way that the temperature in the side nearer to the base member than the center of the glass powder film is becomes higher as compared with the temperature in the side opposite to the base member with respect to the center of the glass powder film. The method for manufacturing the optical member will be described below in detail with reference to FIG. 5A to FIG. 5D.

Step of Forming Glass Powder Film

Figure 5A:
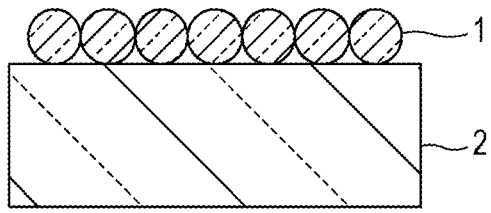
FIG. 5A is a schematic sectional view illustrating an example of a method for manufacturing an optical member according to an aspect of the present invention.

As shown in FIG. 5A, a glass powder film 1 containing a glass powder is formed on the base member 2. In the present invention, it is necessary that a hole structure derived from spinodal type phase separation be formed in the porous glass film 6 on the base member 2. For this purpose, careful composition control of glass is desired and a method in which, after a glass composition has been established, a phase-separable glass powder is produced, the resulting glass powder is applied to the base member 2, and a film is formed by fusion can be employed.

The phase separation property refers to a property that phase separation is induced by a heat treatment. Examples of phase-separable glass include silicon oxide based glass I (silicon oxide-boron oxide-alkali metal oxide), silicon oxide based glass II (silicon oxide-boron oxide-alkali metal oxide-(alkaline-earth metal oxide, zinc oxide, aluminum oxide, zirconium oxide)), and titanium oxide based glass (silicon oxide-boron oxide-calcium oxide-magnesium oxide-aluminum oxide-titanium oxide). Among them, borosilicate based glass composed of silicon oxide-boron oxide-alkali metal oxide can be employed. In particular, the borosilicate based glass having a composition in which the proportion of silicon oxide is 55.0 percent by weight or more and 95.0 percent by weight or less, and especially 60.0 percent by weight or more and 85.0 percent by weight or less can be employed. In the case where the proportion of silicon oxide is in the above-described range, phase-separated glass having high skeletal strength tends to be obtained easily and, therefore, is useful in applications where the strength is required. The molar ratio of boron to alkali components is preferably 0.25 or more and 0.4 or less. If the ratio is out of this range, breakage of the film may occur because of expansion and shrinkage during etching.

As for a method for manufacturing base glass serving as a phase-separable glass powder, the base glass may be produced by a known method except that a raw material is prepared to have the composition of the above-described phase-separable glass. For example, production may be performed by heating and fusing the raw material containing supply sources of the individual components and, as necessary, by molding the raw material into a predetermined form. In the case where heating and fusing are performed, the heating temperature may be set appropriately in accordance with the raw material composition and the like, and usually heating and fusing may be performed within the range of 1,350 degrees (celsius) to 1,500 degrees (celsius).

The glass powder is produced by pulverizing the base glass. The pulverizing method is not specifically limited and a known pulverizing method may be used. Examples of pulverizing methods include liquid phase pulverizing methods using a bead mill and vapor phase pulverizing methods using a jet mill.

Examples of methods for manufacturing the glass powder film 1 include a printing method, a spin coating method, and a dip coating method. Explanations will be made below with reference to a method by using a common screen printing method as an example. In the screen printing method, the glass powder is made into a paste and is printed by using a screen printing machine. Therefore, adjustment of the paste is necessary. The paste contains a thermoplastic resin, a plasticizer, a solvent, and the like in addition to the above-described glass powder.

It is desirable that the proportion of the glass powder contained in the paste be within the range of 30.0 percent by weight or more and 90.0 percent by weight or less, and preferably 35.0 percent by weight or more and 70.0 percent by weight or less.

The thermoplastic resin contained in the paste is a component that enhances the film strength after drying and imparts flexibility. As for the thermoplastic resin, polybutyl methacrylate, polyvinyl butyral, polymethyl methacrylate, polyethyl methacrylate, ethyl cellulose, and the like may be used. These thermoplastic resins may be used alone or in combination. The content of the thermoplastic resin contained in the paste is preferably 0.1 percent by weight or more and 30.0 percent by weight or less. If the content is less than 0.1 percent by weight, the film strength after drying tends to become low. If the content is more than 30.0 percent by weight, unfavorably, residual components of the resin remain easily in the film after fusion.

Examples of plasticizers contained in the paste include butylbenzyl phthalate, dioctyl phthalate, diisooctyl phthalate, dicapryl phthalate, and dibutyl phthalate. These plasticizers may be used alone or in combination. The content of the plasticizer contained in the paste is preferably 10.0 percent by weight or less. Addition of the plasticizer may control the drying rate and impart flexibility to a dried film.

Examples of solvent contained in the paste include terpineol, diethylene glycol monobutyl ether acetate, and 2,2,4-trimethyl-1,3-pentanediol monoisobutyrate. The above-described solvents may be used alone or in combination. The content of the solvent contained in the paste is preferably 10.0 percent by weight or more and 90.0 percent by weight or less. If the content is less than 10.0 percent by weight, a uniform film is not obtained easily. If the content is more than 90.0 percent by weight, a uniform film is not obtained easily.

The paste may be produced by kneading the above-described materials at a predetermined ratio.

The glass powder film 1 containing the glass powder may be formed by applying the resulting paste to the base member 2 by a screen printing method and drying and removing the solvent component of the paste. In order to achieve a predetermined film thickness, the paste may be repeatedly applied an appropriate number of times and be dried.

Examples of the base member 2 include quartz glass, quartz, sapphire, and heat-resistant glass. Among them, in particular, quartz glass and quartz can be employed from the viewpoints of transparency, heat resistance, and strength. The base member 2 may be a material for low-pass filters and lenses.

The base member 2 can contain silicon oxide and have no phase separation property.

The base member 2 can have resistance to etching of a phase-separated glass. As for the shape of the base member 2, a base member having any shape may be used insofar as the porous glass film 6 is formed. The shape of the base member 2 may have a curvature.

Step of Fusing Glass Powder

Figure 5B:
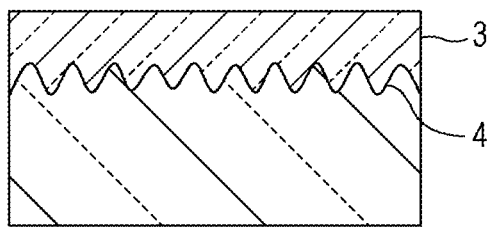
FIG. 5B is a schematic sectional view illustrating an example of a method for manufacturing an optical member according to an aspect of the present invention.

As shown in FIG. 5B, particles of the glass powder in the glass powder film 1 are fused with each other through heating and, thereby, a phase-separable base material glass film 3 is formed on the base member 2. In this fusing step, heating is performed in such a way that the temperature in the side nearer to the base member than the center of the glass powder film 1 is becomes higher as compared with the temperature in the side opposite to the base member 2 with respect to the center of the glass powder film.

The temperature of the side of the interface between the glass powder film 1 and the base member 2 is made high and, thereby, it is possible to fuse the surface of the base member 2 and enhance the comformability at the interface between the glass powder film 1 and the base member 2. As a result, recessed and convex potions are formed in an interfacial region 4 between the glass powder film 1 and the base member 2, a gradient is generated in the porosity of the interfacial region 4 because of the hole structure of the porous glass film 6 formed later. Consequently, an optical member is obtained easily, wherein a sharp change in the refractive index, which causes an occurrence of ripple, is suppressed at the interface between the base member and the porous glass film. The region of the convex portion is formed from the same material as the material for the base member 2 fused, and the region of the recessed portion is formed from the same material as the material for the base material glass film 3 serving as the porous glass film 6. That is, in the material configuration, the same material as the material for the base member 2 and the same material as the material for the base material glass film 3 are repeated in that order in an in-plane direction of the base member 2 in this interfacial region 4. The surface of the glass powder film 1 is at a lower temperature and, therefore, vaporization of boron and sodium is suppressed. It is suppressed that the phase separation property is not obtained because of an occurrence of a change in the composition due to vaporization of boron and sodium and reflection increases at the porous glass surface because of a reduction in porosity of the final porous glass film 6 in itself.

Mutual diffusion of components may occur between the base member 2 and the glass powder film 1. As a result of the component diffusion, the composition of the glass powder film 1 in the interfacial region 4 may change. Specifically, silicon oxide may increase. In this case, the porosity of the porous glass film 6 in the interfacial region 4 is configured to become smaller than the porosity of the surface, or the porosity is configured to increase from the interface between the base member 2 and the porous glass film 6 toward the surface of the porous glass film 6. That is, in the resulting configuration, the porosity increases in the direction from the center of the base member 2 toward the center of the porous glass film 6 in the interfacial region 4 between the base member 2 and the porous glass film 6.

The fusion temperature is preferably 800 degrees (celsius) or higher and 1,100 degrees (celsius) or lower. If the temperature is lower than 800 degrees (celsius), recessed and convex portions are not generated in the interfacial region 4 between the glass powder film 1 and the base member 2. As a result, a porosity gradient does not appear, so that an optical member having a ripple suppression effect is not obtained. If the temperature is higher than 1,100 degrees (celsius), an effect of suppressing vaporization of sodium, boron, and the like from the surface of the glass powder film 1 is not obtained sufficiently.

Infrared lamp heating is mentioned as a heating method. Specifically, a method in which a member that absorbs infrared rays, for example, a setter composed of silicon carbide (SiC), silicon, or the like is brought into contact with the the base member 2 and heat is added from the base member 2 side through application of infrared rays is mentioned. According to this method, the glass powder film 1 is heated from the base member 2 side, and it is made possible to impart a temperature gradient in such a way that the temperature in the side nearer to the base member 2 than the center of the glass powder film 1 is becomes higher as compared with the temperature in the side opposite to the base member 2 with respect to the center of the glass powder film. The heating time may be the time to generate this temperature gradient. However, if the heating time is long, vaporization of boron and sodium from the surface of the glass powder film 1 increases and, thereby, in some cases, the base material glass film 3 formed in the fusing step does not have a phase separation property. Consequently, the heating time is limited to be within the range in which the base material glass film 3 has the phase separation property.

In addition, heating may be performed in an atmosphere having an oxygen content higher than the oxygen content in air, that is, in an atmosphere having an oxygen content of more than 20%, in order to further suppress vaporization of sodium and boron.

Step of Forming Phase-Separated Glass Film

Figure 5C:
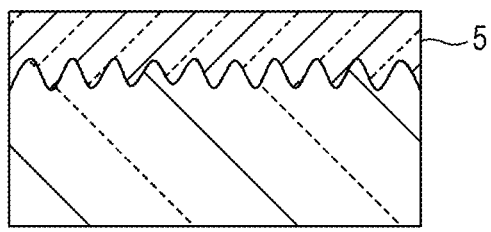
FIG. 5C is a schematic sectional view illustrating an example of a method for manufacturing an optical member according to an aspect of the present invention.

As shown in FIG. 5C, the base material glass film 3 formed on the base member 2 is heated, so as to form a phase-separated glass film 5. Here, the phase-separated glass film 5 refers to a glass film phase-separated into a silicon oxide rich phase and a non-silicon oxide rich phase.

The phase separation treatment is performed by maintaining a temperature of 500 degrees (celsius) or higher and 700 degrees (celsius) or lower for 1 hour to 100 hours. The temperature and the time may be set appropriately in accordance with the hole diameter and the like of the porous glass film to be obtained. In particular, it is necessary that the hole diameter is specified to be 50 nm or less to suppress scattering of the light. Consequently, the phase separation temperature is adjusted to be preferably 500 degrees (celsius) or higher and 600 degrees (celsius) or lower. The heat treatment temperature is not necessarily a constant temperature and the temperature may be changed continuously or stepwise.

Step of Forming Porous Glass Film

Figure 5D:
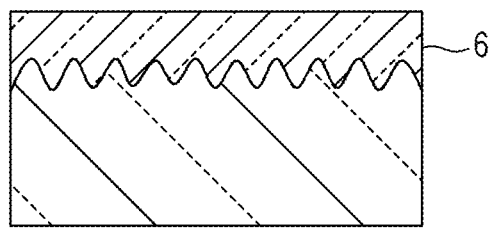
FIG. 5D is a schematic sectional view illustrating an example of a method for manufacturing an optical member according to an aspect of the present invention.

As shown in FIG. 5D, the phase-separated glass film 5 formed on the base member 2 is subjected to an etching treatment and, thereby, the porous glass film 6 having continuous holes is formed on the base member 2. The non-silicon oxide rich phase of the phase-separated glass film 5 is removed by the etching treatment while the silicon oxide rich phase remains. The remaining portion serves as a skeleton of the porous glass film 6 and the portion from which the non-silicon oxide rich phase has been removed serves as a hole of the porous glass film 6.

In general, the etching treatment to remove the non-silicon oxide rich phase is a treatment to elute the non-silicon oxide rich phase, which is a soluble phase, through contact with an aqueous solution. In general, the method for bringing the aqueous solution into contact with the glass is a method in which the glass is immersed in the aqueous solution, although not specifically limited insofar as the glass is brought into contact with the aqueous solution in the method. For example, the glass may be coated with the aqueous solution. As for the aqueous solution required for the etching treatment, known solutions, e.g., water, acid solutions, and alkaline solutions, capable of dissolving the non-silicon oxide rich phase may be used. A plurality of types of step to bring the glass into contact with these aqueous solutions may be selected in accordance with uses.

In the etching treatment of common phase-separated glass, an acid treatment is used favorably from the viewpoints of a small load on an insoluble phase (silicon oxide rich phase) and the degree of selective etching. The non-silicon oxide rich phase, which is an acid-soluble component, is removed through elution because of contact with an acid solution, while corrosion of the silicon oxide rich phase is relatively small, so that high selective etchability is ensured.

Examples of acid solutions can include inorganic acids, e.g., hydrochloric acid and nitric acid. As for the acid solution, usually, an aqueous solution by using water as a solvent can be employed. Usually, the concentration of the acid solution may be specified to be within the range of 0.1 to 2.0 mol/L appropriately. In the acid treatment step, the temperature of the acid solution may be specified to be within the range of room temperature to 100 degrees (celsius) and the treatment time may be specified to be about 1 to 500 hours.

Several hundred nanometers of silicon oxide layer, which hinders etching, may be generated on the glass surface after the phase separation treatment depending on the glass composition. This surface layer may be removed by polishing, an alkali treatment, or the like.

Gel silicon oxide may deposit on the skeleton depending on the glass composition. If necessary, a multistage etching method using acid etching solutions having different acidities or water may be employed. Etching may be performed at etching temperatures of room temperature to 95 degrees (celsius). Ultrasonic waves may be applied during the etching treatment, if necessary.

In general, a water treatment (Etching step 2) can be performed after a treatment with an acid solution, an alkaline solution, or the like (Etching step 1) is performed. In the case where the water treatment is performed, adhesion of residual components to a porous glass skeleton is suppressed and a porous glass film having a higher porosity tends to be obtained.

In general, the temperature in the water treatment step is preferably within the range of room temperature to 100 degrees (celsius). The duration of the water treatment step is specified appropriately in accordance with the composition, the size, and the like of the glass concerned and may be usually about 1 hour to 50 hours.

The structure of the thus produced optical member, that is, a change in the porosity in the vicinity of the interface between the base member 2 and the porous glass film 6 is examined on the basis of a broken-out section of the glass by using an observation techniques, e.g., a scanning electron microscope (SEM) and a transmission electron microscope (TEM).

EXAMPLES

The present invention will be described below with reference to the examples.

However, the present invention is not limited to the examples.

Base Member A

A quartz base member (produced by IIYAMA PRECISION GLASS CO., LTD., softening point 1,700 degrees (celsius), Young's modulus 72 GPa) was used as a base member A. The base member A having a thickness of 0.5 mm was used after being cut into the size of 50 mm×50 mm and being subjected to mirror finishing.

Production Example of Glass Powder A

A mixed powder of a silicon oxide powder, boron oxide, sodium carbonate, and aluminum oxide was fused in a platinum crucible at 1,500 degrees (celsius) for 24 hours, where the charge composition was specified to be 64 percent by weight of $SiO_2$, 27 percent by weight of $B_2O_3$, 6 percent by weight of $Na_2O$, and 3 percent by weight of $Al_2O_3$. The fused raw material was poured into a graphite mold after the temperature was lowered to 1,300 degrees (celsius). Standing to cool was performed in air for about 20 minutes, keeping was performed in a slow cooling furnace at 500 degrees (celsius) for 5 hours, and finally, cooling was performed for 24 hours, so as to obtain borosilicate glass. The resulting block of the borosilicate glass was pulverized by using a jet mill until the average particle diameter became 4.5 micrometers, so as to obtain the glass powder A. The crystallization temperature of the glass powder A was 800 degrees (celsius).

Production Example of Glass Paste A

Glass powder A: 60 parts by mass

Alpha-terpineol: 44 parts by mass

Ethyl cellulose (trademark ETHOCEL Std 200 (produced by Dow Chemical Company)): 2 parts by mass The above-described raw materials were agitated and mixed, so as to obtain a glass paste A. The viscosity of the glass paste A was 31,300 mPas.

Production Example of Glass Powder film A

The glass paste A was applied to the base member A through screen printing. A printing machine employed was MT-320TV produced by Micro-tec Co., Ltd. A plate 30 mm×30 mm of #500 was used. The solvent was dried by standing in a drying furnace at 100 degrees (celsius) for 10 minutes, so as to form a glass powder film A.

Example 1

A base member A was placed on SiC while being in contact with SiC. The temperature of a glass powder film A was raised to 800 degrees (celsius) at 10 degrees (celsius)/min. A heat treatment was performed for 1 hour to induce fusion, so as to form a base material glass film on the base member A. An IR gold image furnace QHC-P610 produced by ULVAC-RIKO, Inc., was used as a firing furnace. In order that the firing atmosphere had an oxygen concentration of 50% or more, oxygen flowing was performed for 10 minutes before the temperature was raised, and a heat treatment was performed while the oxygen flowing was continued. After cooling to room temperature was performed, a phase separation treatment was performed at 600 degrees (celsius) for 50 hours. Subsequently, the outermost surface was polished, so as to form a phase-separated glass film.

The phase-separated glass film was immersed in a 1.0 mol/L nitric acid aqueous solution heated to 80 degrees (celsius) and was stood for 24 hours while being kept at 80 degrees (celsius). Then the phase-separated glass film was immersed in distilled water heated to 80 degrees (celsius) and was stood for 24 hours. The glass body was taken out of the solution and was dried at room temperature for 12 hours, so as to obtain Sample 1.

According to observation of Sample 1 with SEM, a porous glass film having a film thickness of 4.0 micrometers was disposed on a base member. It was ascertained that recessed and convex portions were disposed in the interfacial region between the base member and the porous glass film.

Example 2

Figure 6:
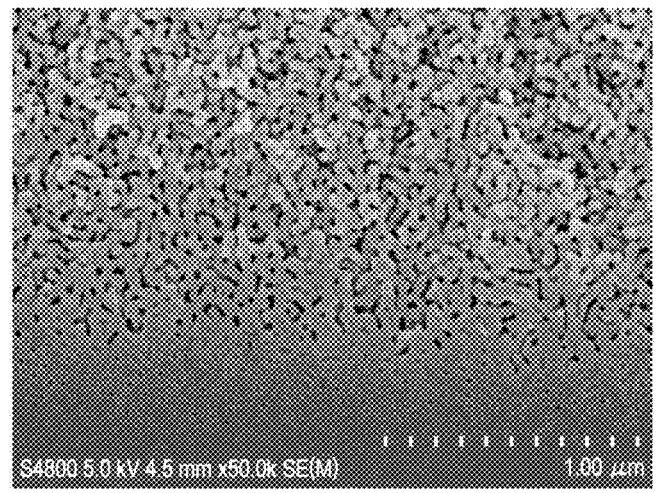
FIG. 6 is an electron micrograph of a cross-section of an optical member produced in Example 2.

In the present example, Sample 2 was obtained through the same steps as the steps in Example 1 except that the heat treatment temperature in fusion was specified to be 900 degrees (celsius). FIG. 6 is an electron microscope observation diagram (SEM image) of a part of a cross-section of the base member and the porous glass film of Sample 2.

According to observation of Sample 2 with SEM, a porous glass film having a film thickness of 4.0 micrometers was disposed on a base member. In addition, as shown in FIG. 6, it was ascertained that recessed and convex portions were disposed in the interfacial region between the base member and the porous glass film. It is believed that, in the fusing step, the base member A conformed to the glass powder film through the heat treatment at a high temperature and recessed and convex portions were formed in the interfacial region and, thereby, a porosity gradient was generated in the interfacial region.

Example 3

In the present example, Sample 3 was obtained through the same steps as the steps in Example 1 except that the heat treatment temperature in fusion was specified to be 1,000 degrees (celsius) and the heat treatment time was specified to be 5 minutes. According to observation of Sample 3 with SEM, a porous glass film having a film thickness of 4.0 micrometers was disposed on a base member. In addition, it was ascertained that recessed and convex portions were disposed in the interfacial region between the base member and the porous glass film. It was further ascertained that the interfacial region between the base member and the porous glass film was wider than the interfacial region in Sample 2.

Comparative Example 1

In the present comparative example, Sample 4 was obtained through the same steps as the steps in Example 1 except that the heat treatment temperature in fusion was specified to be 700 degrees (celsius). According to observation of Sample 4 with SEM, a porous glass film having a film thickness of 4.0 micrometers was disposed on a base member. However, recessed and convex portions were not observed in the interfacial region between the base member and the porous glass film.

Measurement of Reflectance

Figure 7:
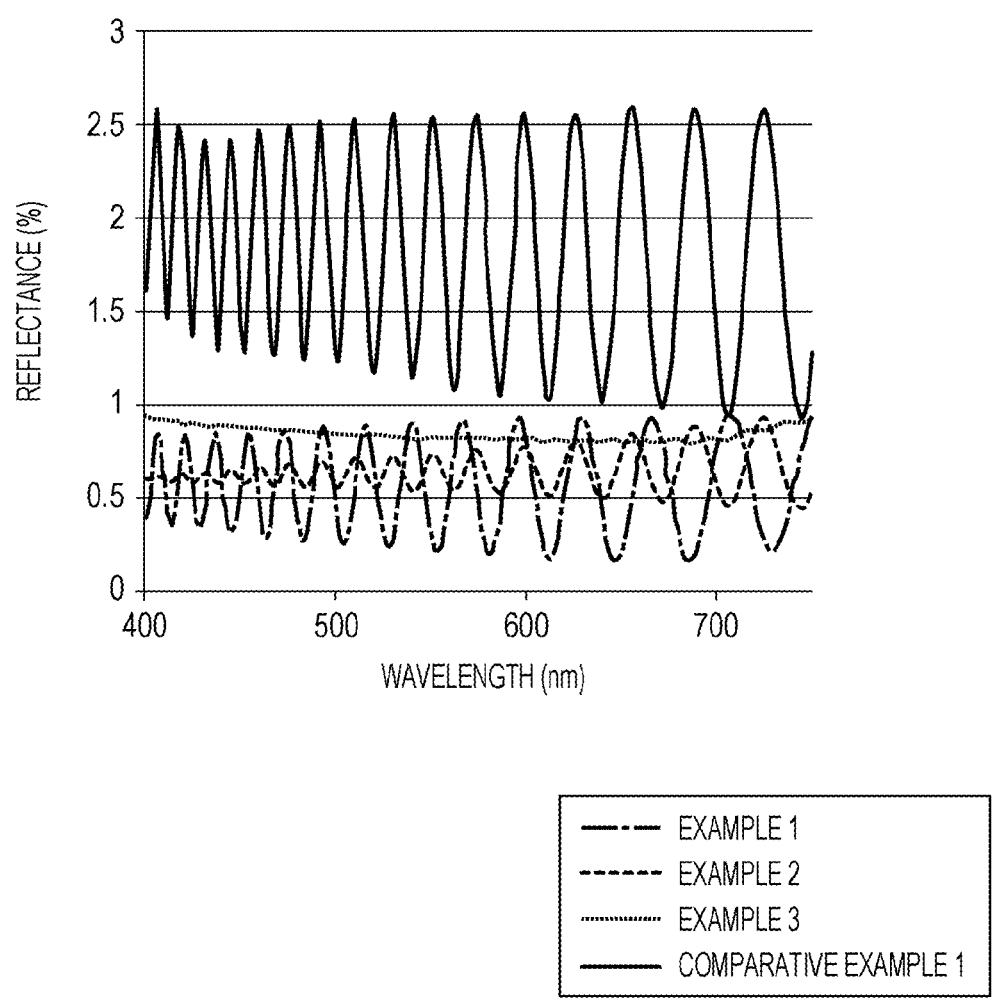
FIG. 7 is a diagram showing the wavelength dependence of reflectance of Examples 1 to 3 and Comparative example 1.

The reflectance of each of Examples 1 to 3 and Comparative example 1 was measured. A lens reflectance measuring apparatus (USPM-RU, produced by Olympus Corporation) was used in the measurement. Light was incident on the side where the porous glass film on the base member was present, and the amount of the reflected light thereof was measured. The measurement wavelength region was 400 nm to 750 nm FIG. 7 shows the wavelength dependence of reflectance of each of samples of Examples 1 to 3 and Comparative example 1. It is believed from FIG. 7 that the wavelength dependence of reflectance of each of samples of Examples 1 to 3 is suppressed and a ripple is suppressed as compared with that of the sample of Comparative example 1. It is ascertained that a maximum reflectance of each of samples of Examples 1 to 3 is smaller than that of Sample 4 of Comparative example 1.

Comparative Example 2

In the present comparative example, Sample 5 was obtained through the same steps as the steps in Example 2 except that a muffle furnace was used as the firing furnace and the temperature of the whole glass powder film A was raised uniformly. The appearance of Sample 5 was white on the basis of visual observation and, therefore, it was found that devitrification occurred. The reason for this is believed to be that the temperature of the surface of the phase-separated glass film was raised, sodium and boron, which were volatile components, were vaporized and, thereby, crystallization of silica occurred.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-253071, filed Nov. 18, 2011 and No. 2012-237793, filed Oct. 29, 2012, which are hereby incorporated by reference herein in their entirety.

REFERENCE SIGNS LIST

1 Glass powder
2 Base member

3 Base material glass film
4 Interfacial region
5 Phase-separated glass film
6 Porous glass film

The invention claimed is:

1. An optical member comprising:
   a base member;
   a porous glass film disposed on the base member; and
   an interfacial region between the base member and the porous glass film,
   wherein the porosity increases in the direction from the base member toward the porous glass film in the interfacial region and the porosity in the porous glass film is constant.

2. The optical member according to claim 1, wherein the porous glass film and the interfacial region include continuous holes derived from spinodal phase separation.

3. The optical member according to claim 1, wherein a thickness of the interfacial region is 50 nm or more.

4. The optical member according to claim 1, wherein a thickness of the porous glass film is 200 nm or more and 50.0 micrometers or less.

5. The optical member according to claim 1, wherein the porosity is continuous in a film thickness direction from the base member to a surface of the porous glass film in the optical member.

6. The optical member according to claim 1, wherein the difference in porosity between adjacent two regions, 4 nm each, is less than 2.5% in the interfacial region.

7. The optical member according to claim 1, wherein the base member comprises quartz glass.

8. The optical member according to claim 1, wherein the base member comprises quartz.

9. The optical member according to claim 1, wherein the porosity of the porous glass film is smaller than the minimum value of the porosity of the interfacial region.

* * * * *